(12) United States Patent
Kunii et al.

(10) Patent No.: US 7,762,519 B2
(45) Date of Patent: Jul. 27, 2010

(54) SUPPORTING DEVICE WITH GOOD USABILITY FOR ELECTRONIC APPARATUS AND ELECTRONIC APPARATUS

(75) Inventors: Masaru Kunii, Kawasaki (JP); Masaki Kobayashi, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 12/332,762

(22) Filed: Dec. 11, 2008

(65) Prior Publication Data

US 2009/0152432 A1    Jun. 18, 2009

(30) Foreign Application Priority Data

Dec. 13, 2007    (JP) .............................. 2007-321493

(51) Int. Cl.
*F16M 11/00* (2006.01)
(52) U.S. Cl. ........................ 248/688; 248/398; 248/456; 248/460
(58) Field of Classification Search ................. 248/688, 248/398, 454, 455, 456, 460, 463
See application file for complete search history.

(56) References Cited

U.S. PATENT DOCUMENTS

| | | | | |
|---|---|---|---|---|
| 5,607,135 | A * | 3/1997 | Yamada | 248/456 |
| 6,971,622 | B2 * | 12/2005 | Ziegler et al. | 248/454 |
| 7,540,466 | B2 * | 6/2009 | Yang | 248/688 |
| 2006/0108494 | A1 * | 5/2006 | Lancet | 248/456 |
| 2006/0186303 | A1 * | 8/2006 | Phifer et al. | 248/454 |
| 2007/0221811 | A1 * | 9/2007 | Hauser et al. | 248/454 |
| 2008/0006753 | A1 * | 1/2008 | Campagnoli et al. | 248/398 |
| 2008/0149801 | A1 * | 6/2008 | Wood | 248/450 |

FOREIGN PATENT DOCUMENTS

JP    2004-266087 A    9/2004

* cited by examiner

*Primary Examiner*—Ramon O Ramirez
(74) *Attorney, Agent, or Firm*—Sughrue Mion, PLLC

(57) ABSTRACT

For installing an apparatus body of an electronic apparatus at a standing state on a supporting surface, the supporting device includes a leg and support. The leg is rotatably provided on a back surface of the apparatus body at the standing state and is used for holding the apparatus body supported by the supporting surface. The support is rotatably provided on the back surface and engaged with the leg for defining an angle of the leg with respect to the back surface. The leg and the support are foldable in substantially parallel to the back surface without overlapping with each other.

17 Claims, 9 Drawing Sheets

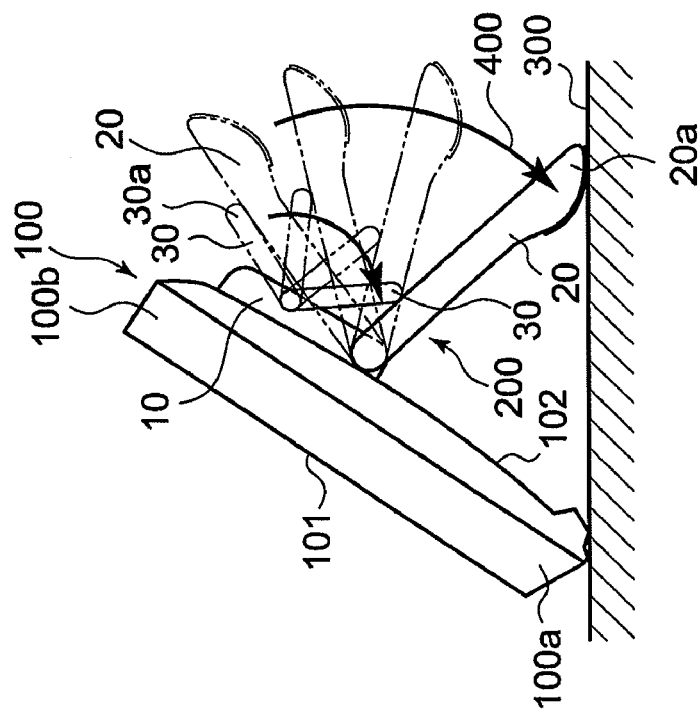
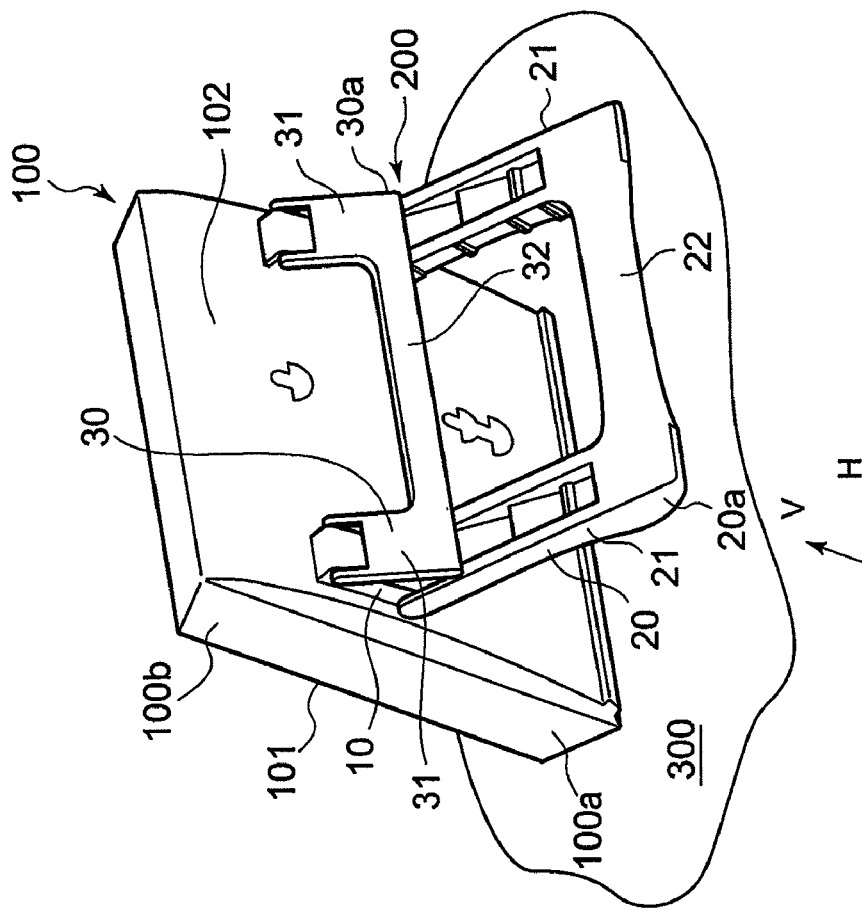
FIG. 1B
FIG. 1A

SUPPORTING DEVICE WITH GOOD USABILITY FOR ELECTRONIC APPARATUS AND ELECTRONIC APPARATUS

This application is based upon and claims the benefit of priority from Japanese patent application No. 2007-321493, filed Dec. 13, 2007, the disclosure of which is incorporated herein in its entirety by reference.

TECHNICAL FIELD

The present invention relates to a supporting device for installing or supporting an electronic apparatus at a state where it gets up from a supporting surface, that is, at a standing state, and to an electronic apparatus provided with the supporting device.

BACKGROUND ART

It is known an electronic apparatus provided with a touch panel type liquid crystal display for carrying out at least one of input and output of information. In view of usability of a user, some installation modes, that is, first, second and third installation modes (will be described later) are prepared in this type of electronic apparatus. The first installation mode is a mode in which an apparatus body of the electronic apparatus is held at a standing posture on a supporting surface. The second installation mode is a mode in which the apparatus body is hung on a wall. The third installation mode is a mode in which the apparatus body is flatly laid on the supporting surface. A supporting device for supporting the apparatus body so that the apparatus body standing on the supporting surface is not fallen is used for the first installation mode. An opening corresponding to a hook provided on the wall is formed for the second installation mode on a back surface of the apparatus body. The back surface of the apparatus body is formed for the third installation mode in a steady form against the supporting surface.

For example, Japanese Patent Application Publication No. 2004-266087 discloses a telephone capable of selectively taking one of the first to third installation modes. The telephone includes a supporting device for obtaining the first installation mode. The supporting device includes a stand and an arm respectively provided rotatably in the telephone, which can be engaged with each other. The stand abuts on a supporting surface with a rotary angle determined by engagement between the stand and the arm, by which a posture of the telephone in the first installation mode is defined. The stand and the arm can be folded when to obtain the second or the third installation mode, and thus, they are not required to be removed.

SUMMARY OF THE INVENTION

However, in the supporting device for the telephone disclosed in Japanese Patent Application Publication No. 2004-266087, a rotary supporting point of the stand and a rotary supporting point of the arm are relatively far apart from each other. In addition, since the arm has a receiving portion for receiving the stand, the arm has to become long (large). Therefore, it is inevitable to overlap the stand and the arm with each other when they are folded. For this reason, it is inferior in usability of the user.

It is therefore an exemplary object of the present invention to provide a supporting device for an electronic apparatus which is small-sized and simple and is excellent in usability of a user.

It is another exemplary object of the present invention to provide an electronic apparatus having such a supporting device.

Other objects of the present invention will become clear as the description proceeds.

According to an exemplary aspect of the present invention, there is provided a supporting device capable of installing an apparatus body of an electronic apparatus at a standing state on a supporting surface, the supporting device comprising a leg which is rotatably provided on a back surface of the apparatus body at the standing state and is used for holding the apparatus body supported by the supporting surface; and a support which is rotatably provided on the back surface and engaged with the leg for defining an angle of the leg with respect to the back surface, wherein the leg and the support are foldable in substantially parallel to the back surface without overlapping with each other.

According to another exemplary aspect of the present invention, there is provided an electronic apparatus comprising an apparatus body of the electronic apparatus and the above-mentioned supporting device.

BRIEF DESCRIPTION OF THE DRAWINGS

FIG. 1A is a perspective view when an apparatus body is in a third posture, showing a first installation mode of an electronic apparatus according to an exemplary embodiment of the present invention;

FIG. 1B is a side view in the same manner as FIG. 1A;

DESCRIPTION OF THE EXEMPLARY EMBODIMENT

Figure 2:
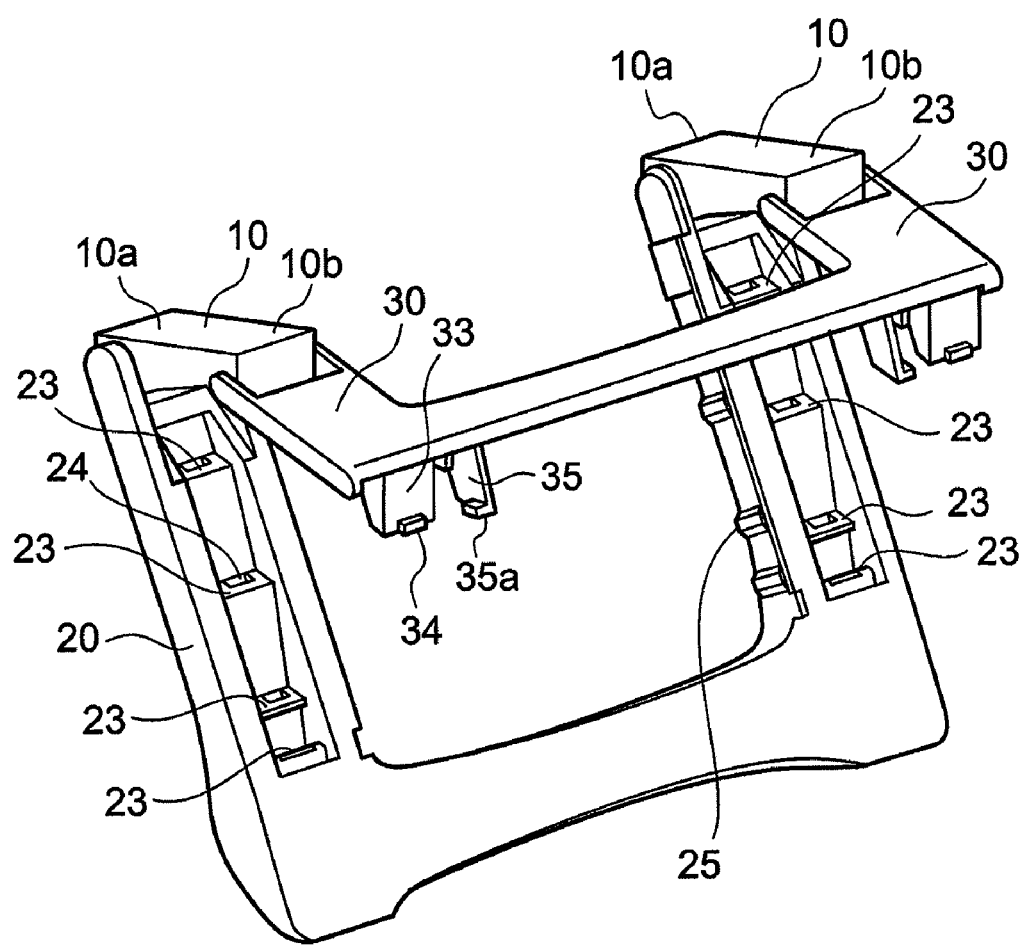
FIG. 2 is a perspective view of a supporting device included in the electronic apparatus shown in FIGS. 1A and 1B.

A structure of an electronic apparatus according to an exemplary embodiment of the present invention will be described with reference to FIGS. 1A to 3.

The electronic apparatus is shown in FIGS. 1A and 1B and includes an apparatus body 100 provided with a touch panel type liquid crystal display on a front surface 101 thereof, and a supporting device 200 connected or attached to a back surface 102 of the apparatus body 100. In this electronic apparatus, first, second and third installation modes are prepared. The first installation mode is a mode in which the apparatus body 100 holds a standing posture on a supporting surface 300 such as a desk as shown in FIGS. 1A and 1B. The second installation mode is a mode in which the apparatus body 100 is hung on a side wall. The third installation mode is a mode in which the apparatus body 100 is flatly laid on the supporting surface 300.

Although the apparatus body 100 used herein has a substantially rectangular plate shape, a back surface 102 thereof bends gently as is seen from the drawings. The supporting device 200 includes a pair of bases 10 arranged so as to be spaced from each other in a lateral direction H of the apparatus body 100 and fixed on the back surface 102 of the apparatus body 100, and a substantially U-shaped leg 20 and a substantially U-shaped support 30 respectively provided rotatably on these bases 10.

As known in the art, such an apparatus body may include a casing or a frame. In this case, the touch panel type liquid crystal display may be supported by the casing or the frame. Therefore, the bases 10 may also be attached or fixed to the casing or the frame.

The leg 20 includes a pair of leg elements 21 spaced from each other in the lateral direction H of the apparatus body 100, and a connecting element 22 for connecting between these leg elements 21. In other words, the support 30 includes a pair of supporting elements 31 spaced from each other in the lateral direction H of the apparatus body 100, and a connecting element 32 for connecting between these supporting elements 31.

The leg 20 is one for securing the first installation mode by abutting on the supporting surface 300 by means of a rotary end portion 20a. The support 30 is shorter than the leg 20, and is one for determining a rotary angle of the leg 20 by engaging with the leg 20. In the first installation mode, the rotary angle of the leg 20 allows a posture of the apparatus body 100 to be selectively set from first to fourth postures as will become clear later. Namely, a standing angle of the apparatus body 100 can be adjusted. In this regard, the posture of the apparatus body 100 shown in FIGS. 1A and 1B is called a third posture.

Each of the bases 10 extends in a longitudinal direction V along the back surface 102 of the apparatus body 100 that is in a first posture. The leg 20 is rotatably attached to a lower end portion 10a of each of the bases 10 so that the rotary end portion 20a can approach or get away from a lower end portion 100a of the apparatus body 100. The support 30 is rotatably attached to an upper end portion 10b of each of the bases 10 so that a rotary end portion 30a can approach or get away from an upper end portion 100b of the apparatus body 100.

As shown in FIGS. 1A and 1B, when the apparatus body 100 of the electronic apparatus is caused to stand on the supporting surface 300 to be installed, the rotary end portion 20a of the leg 20 gets away from the back surface 102 of the apparatus body 100, and the rotary end portion 20a gets into touch with the supporting surface 300 together with the lower end portion 100a of the apparatus body 100. With this, the rotary end portion 30a of the support 30 gets away from the back surface 102 of the apparatus body 100, and the support 30 engages with the leg 20 so that an opening angle of the leg 20 is defined as measure in accordance with a standing angle of the apparatus body 100.

As is obvious from FIG. 2, the leg 20 is provided with a plurality of (specifically, four) support receiving sections 23 formed so as to be arranged in a saw-tooth and staircase pattern. Protruding pieces 33 are formed on the rotary end portion 30a of the support 30. The protruding pieces 33 selectively engage with any of the plurality of support receiving sections 23. The support 30 can move in only one direction, that is, in only a direction to cause the opening angle of the leg 20 to become small with a latch mechanism while keeping in contact with the leg 20. Therefore, by changing the support receiving sections 23 that the protruding pieces 33 are to engage, it is possible to enlarge the standing angle of the apparatus body 100 easily.

Figure 3:
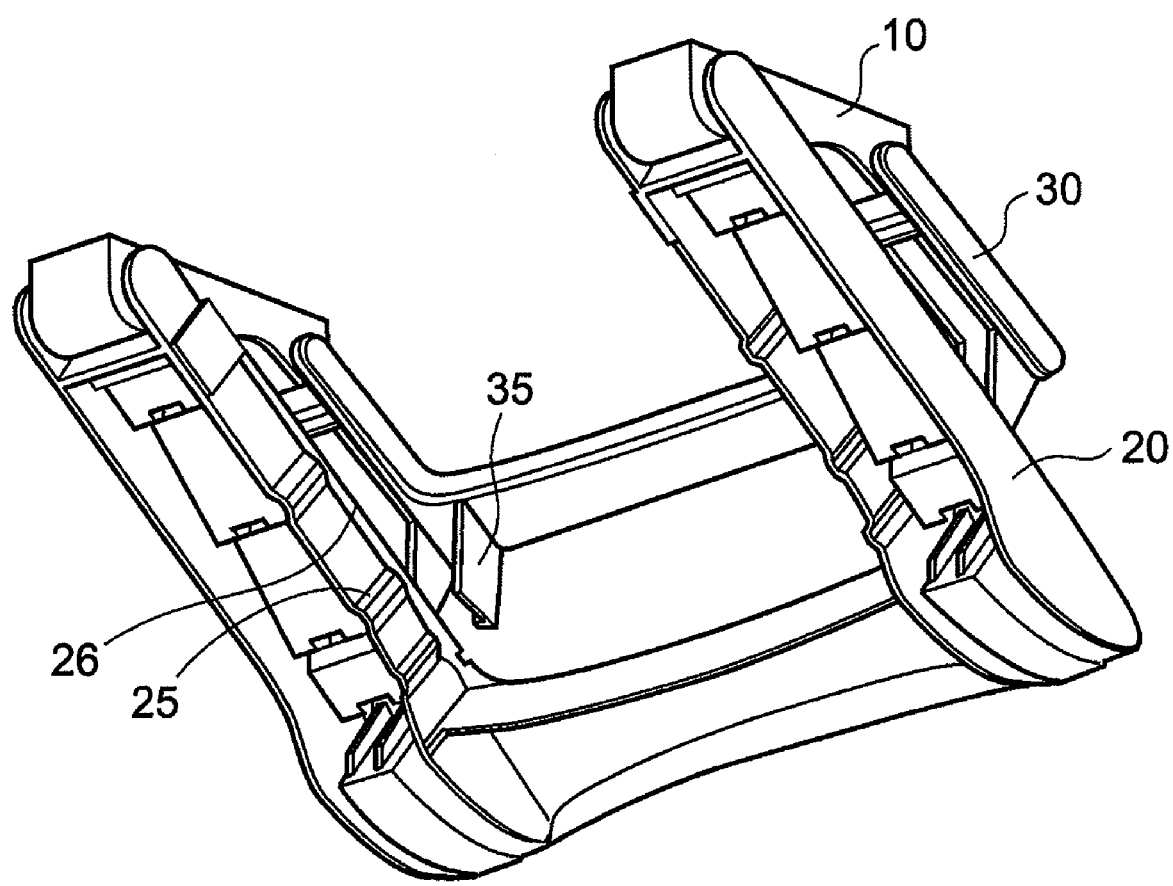
FIG. 3 is a perspective view when the supporting device of FIG. 2 is viewed from another direction.

The explanation will further be continued with reference to FIGS. 2 and 3.

In FIGS. 2 and 3, in each support receiving section 23 of the leg 20, a concave portion (or opening) 24 is formed. In the leg 20, ribs 26 extending to a range in which the support receiving sections 23 are formed so as to be arranged are also formed. In the leg 20, knots 25 are further formed so as to correspond to the respective support receiving sections 23.

On the other hand, a claw 34 is formed at a tip of each protruding piece 33 of the support 30. In the support 30, an elastic piece 35 in which a protrusion 35a is formed at a tip thereof is formed in the vicinity of each of the protruding pieces 33.

Figure 4B:
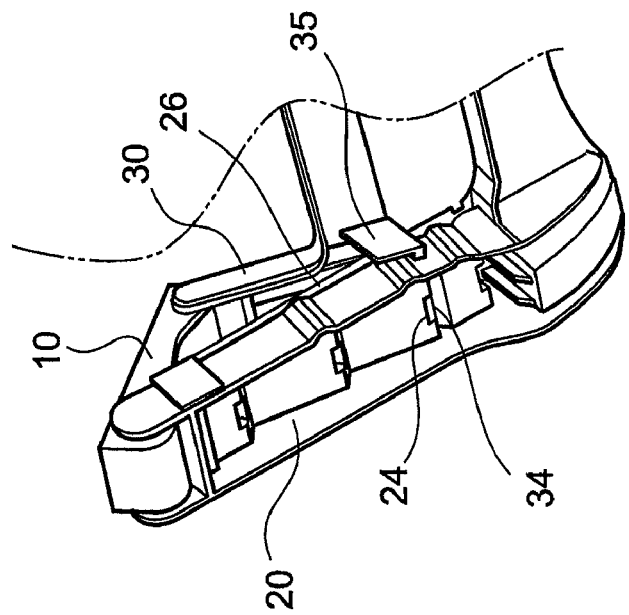
FIG. 4B is an enlarged perspective view of only a main part of FIG. 4A.

Engagement of the support 30 with the leg 20 is basically held by causing the claw 34 to enter the concave portion 24. When the apparatus body 100 caused to stand on the supporting surface 300 is lifted up, the leg 20 tends to get away from the support 30 due to its own weight of the leg 20. However, since the protrusion 35a of the elastic piece 35 hooks into the rib 26 as shown in FIG. 4B, the support 30 is never released from the leg 20. Further, since the protrusion 35a of the elastic piece 35 hooks into the knot 25, the support receiving section 23 with which the support 30 is to engage is never changed. On the contrary, when a user wants to move the leg 20 and the support 30, the user operates with force exceeding elastic force of the elastic piece 35 so that the protrusion 35a of the elastic piece 35 gets over the rib 26 or the knot 25.

Next, a method of changing the opening angle of the leg 20 (standing angle of the apparatus body 100) and a method of folding the leg 20 and the support 30 will be described as a method of operating the supporting device 200 with reference to FIGS. 4A to 7B together with FIGS. 2 and 3.

Figure 4A:
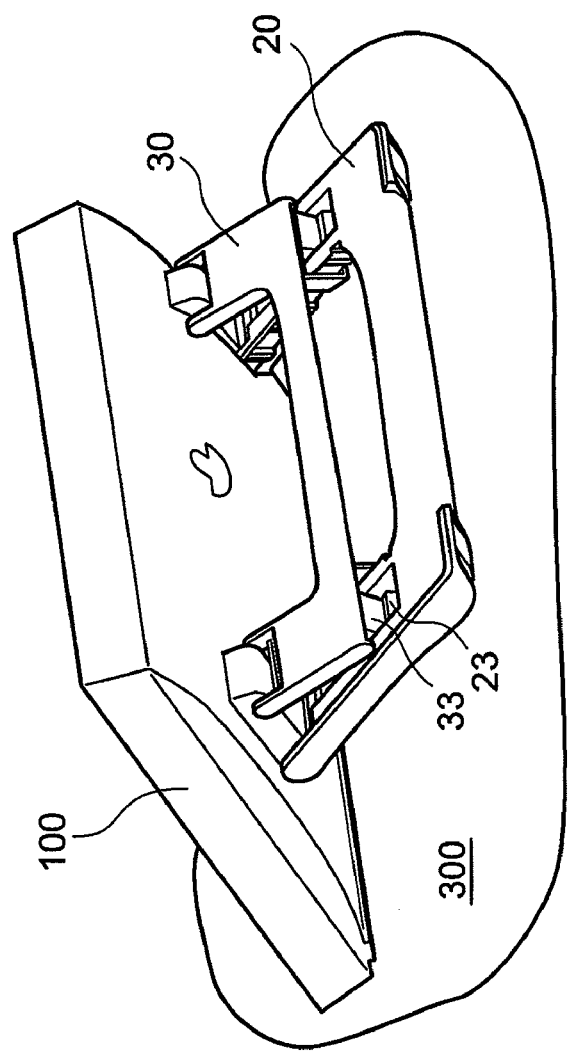
FIG. 4A is a perspective view in the first installation mode when the apparatus body is in a first posture.

In FIG. 4A, the apparatus body 100 is in the first posture, and is caused to stand on the supporting surface 300 by means of the supporting device 200. The protruding pieces 33 of the support 30 respectively engage with ones near the rotary end portion 20a of the support receiving sections 23 of the leg 20. Further, the claw 34 enters the concave portion 24. Moreover, the protrusion 35a of the elastic piece 35 is positioned within a region defined by the rib 26 and the two adjacent knots 25.

Figure 5B:
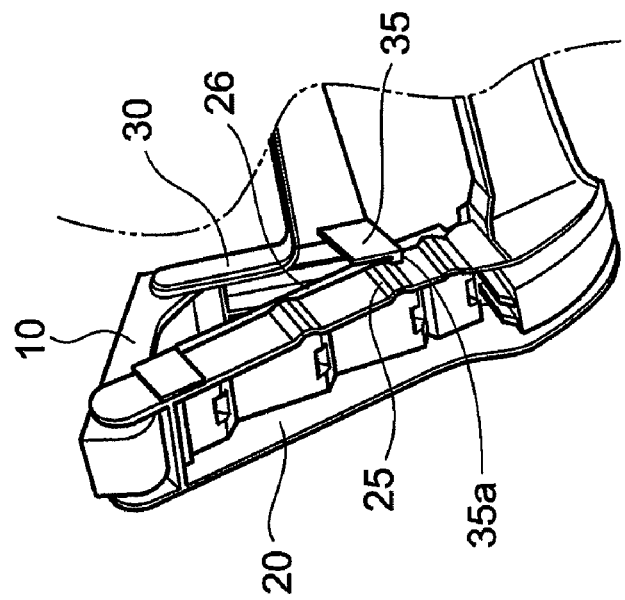
FIG. 5B is an enlarged perspective view of only a main part of FIG. 5 A.
Figure 5A:
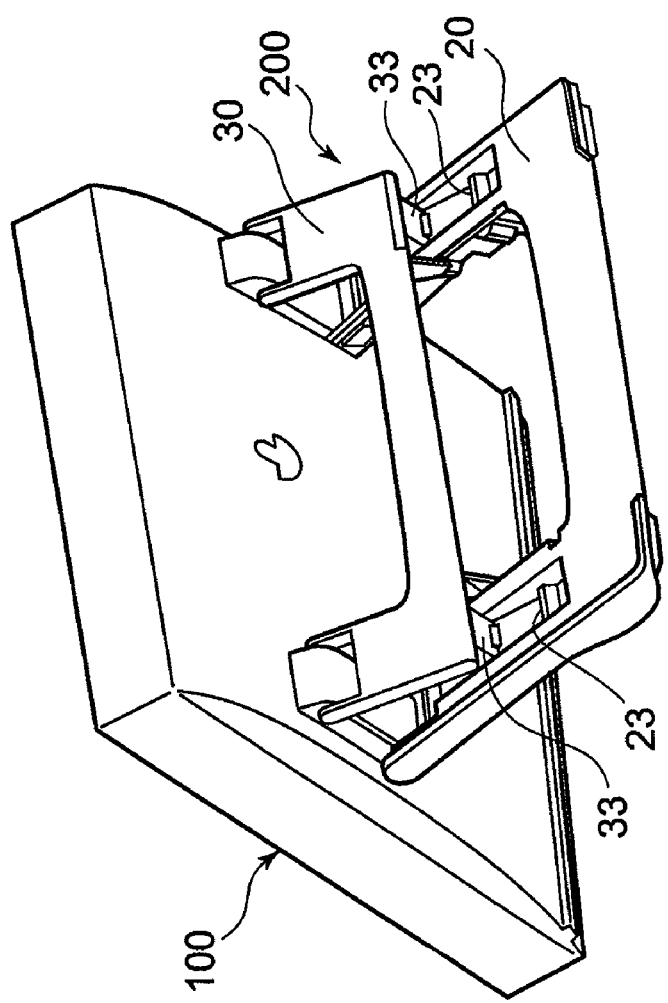
FIG. 5A is a perspective view showing a state when the electronic apparatus being in the first installation mode is lifted up.

When the apparatus body 100 is lifted up, it becomes a state shown in FIGS. 5A and 5B. In this case, the protrusion 35a of the elastic piece 35 of the support 30 hooks into the knot 25 of the leg 20. Therefore, as shown in FIG. 4A, even though the user lifts up the apparatus body 100 caused to stand on the supporting surface 300, the engagement of the support 30 with the leg 20 is never released, and the support receiving section 23 with which the support 30 is to engage is never changed (displaced). As a result, the opening angle of the leg 20 is substantially held.

Figure 6B:
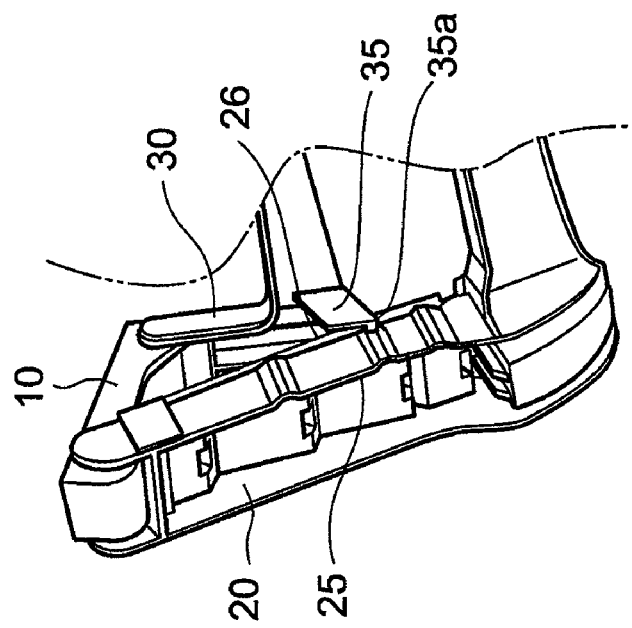
FIG. 6B is an enlarged perspective view of only a main part of FIG. 6A.
Figure 6A:
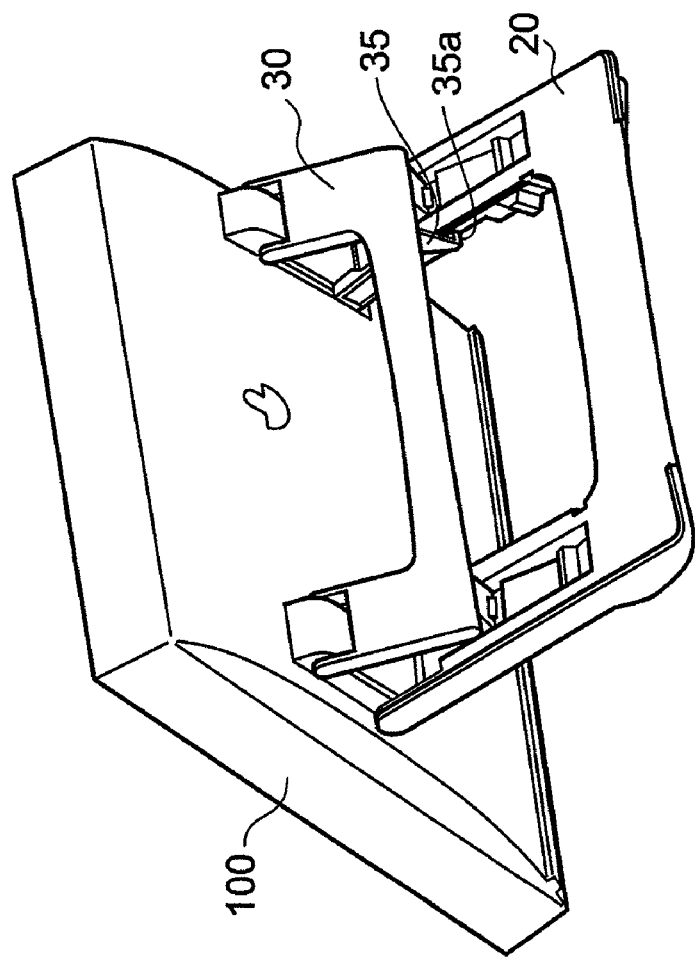
FIG. 6A is a perspective view showing a state in the process of changing the apparatus body from the first posture to a second posture in the first installation mode.
Figure 7B:
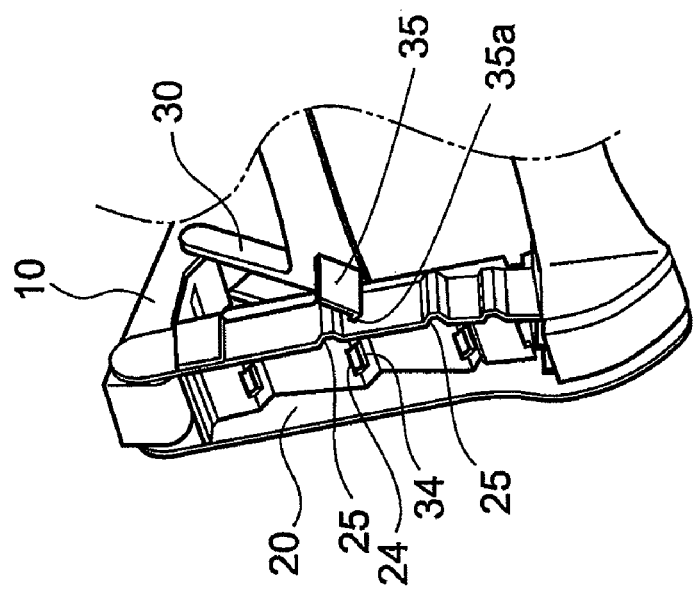
FIG. 7B is an enlarged perspective view of only a main part of FIG. 7A.
Figure 7A:
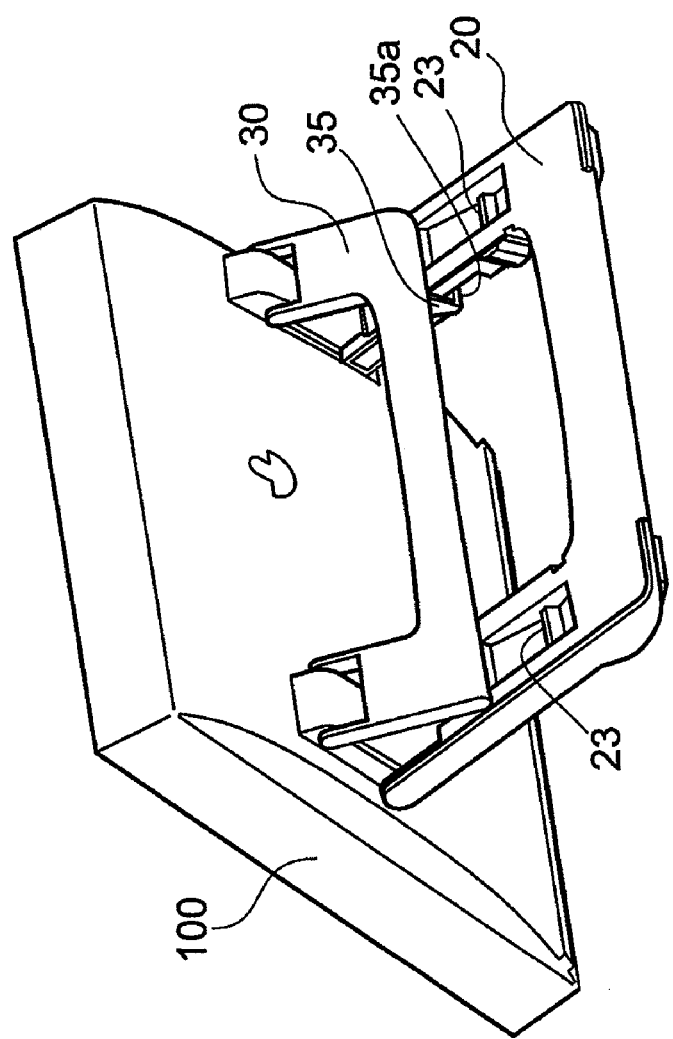
FIG. 7A is a perspective view showing a state after the apparatus body is changed from the first posture to the second posture in the first installation mode.

When the opening angle of the leg 20 (standing angle of the apparatus body 100) is to be changed, the user presses and closes the leg 20 in a direction shown with an arrow 400 in FIG. 1B. This operation causes the protrusions 35a of the elastic pieces 35 to get over the knots 25 along the ribs 26 as shown in FIGS. 6A and 6B, respectively. Then, as shown in FIGS. 7A and 7B, the protruding pieces 33 of the support 30 engage with neighboring ones of the support receiving sections 23 of the leg 20, respectively. Further, the claw 34 enters the corresponding concave portion 24. As a result, the opening angle of the leg 20 is changed, and the apparatus body 100 becomes the second posture.

A third posture of the apparatus body 100 is as have already been explained using FIGS. 1A and 1B. Further, transition of the apparatus body 100 from the third posture to a fourth posture can be implemented by the similar work to transition from the first posture to the second posture as described above.

Figure 8B:
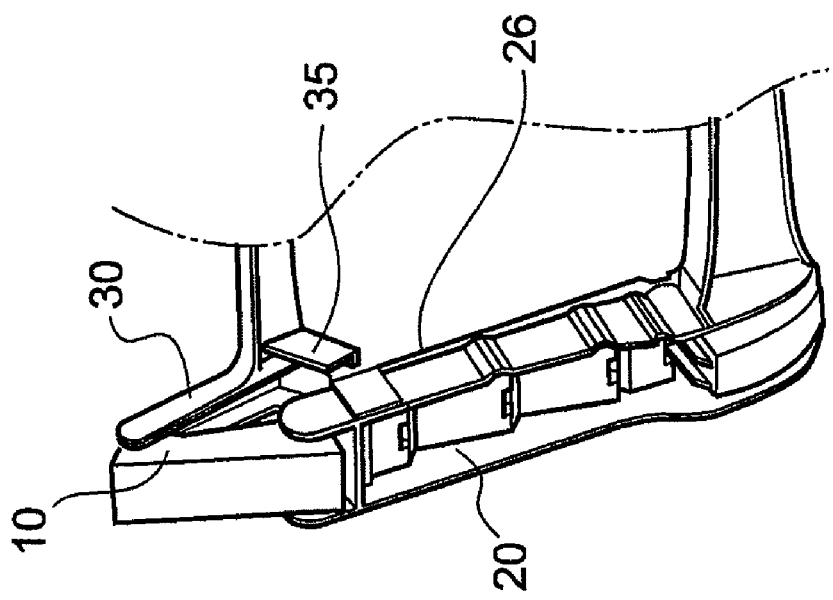
FIG. 8B is an enlarged perspective view of only a main part of FIG. 8A.
Figure 8A:
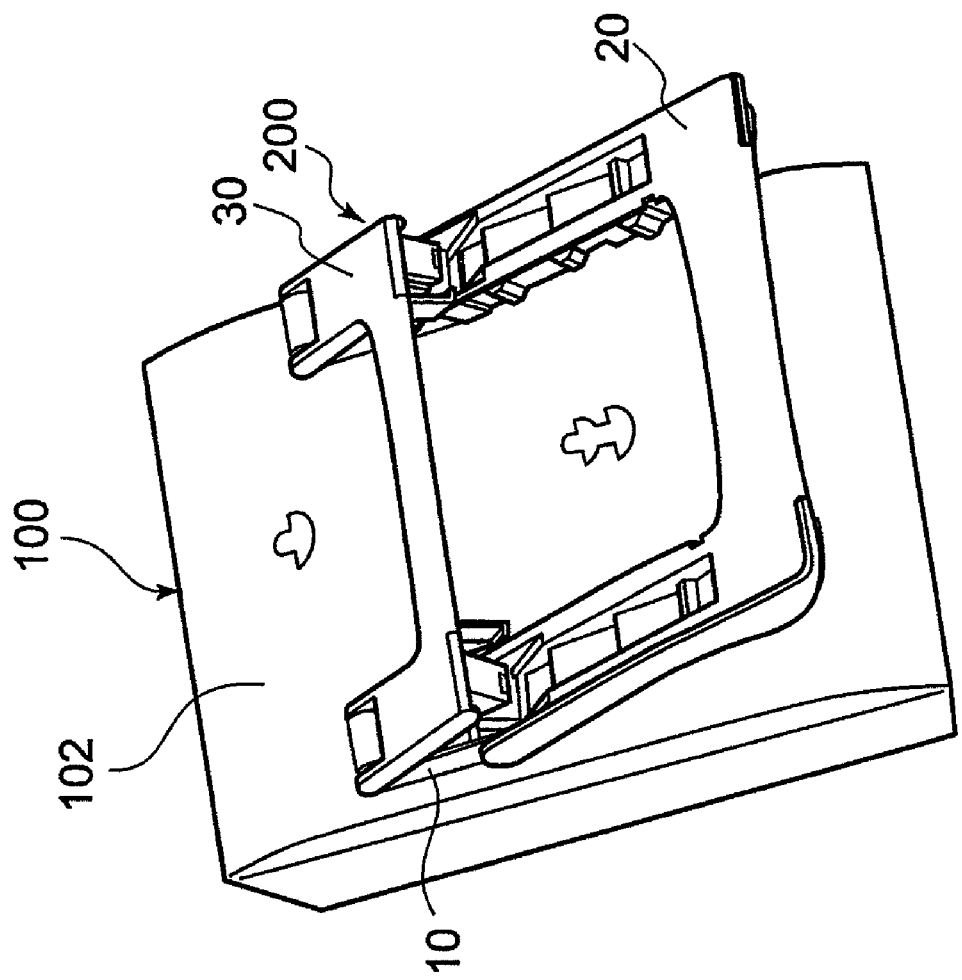
FIG. 8A is a perspective view for explaining work to make transition from the first installation mode to a second installation mode.

Next, when the second installation mode in which the apparatus body 100 is hung on a wall is taken, or when the third installation mode in which the apparatus body 100 is laid on the supporting surface 300 is taken, the user further presses and closes the leg 20 in the direction shown with the arrow 400 in FIG. 1B. This operation causes the protrusion 35a of the elastic piece 35 to get over the rib 26, and the engagement of the support 30 with the leg 20 is easily released as shown in FIGS. 8A and 8B. Moreover, the user rotatively moves the leg 20 and the support 30 in opposite directions to each other, and folds them so as to become substantially parallel to the back surface 102 of the apparatus body 100, thereby obtaining a state of FIGS. 9A and 9B. At this state, the leg 20 and the support 30 are folded so that the rotary end portions 20a, 30a respectively approach the lower end portion 100a and the upper end portion 100b of the apparatus body 100 to uniform a height dimension.

Figure 9B:
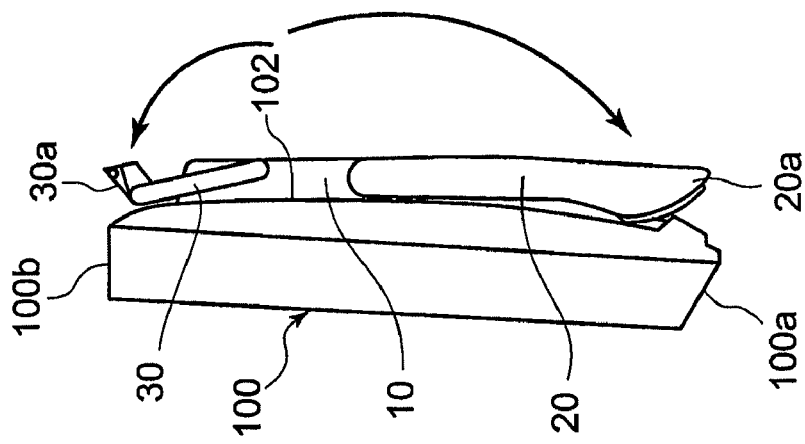
FIG. 9B is a side view in the same manner as FIG. 1A.
Figure 9A:
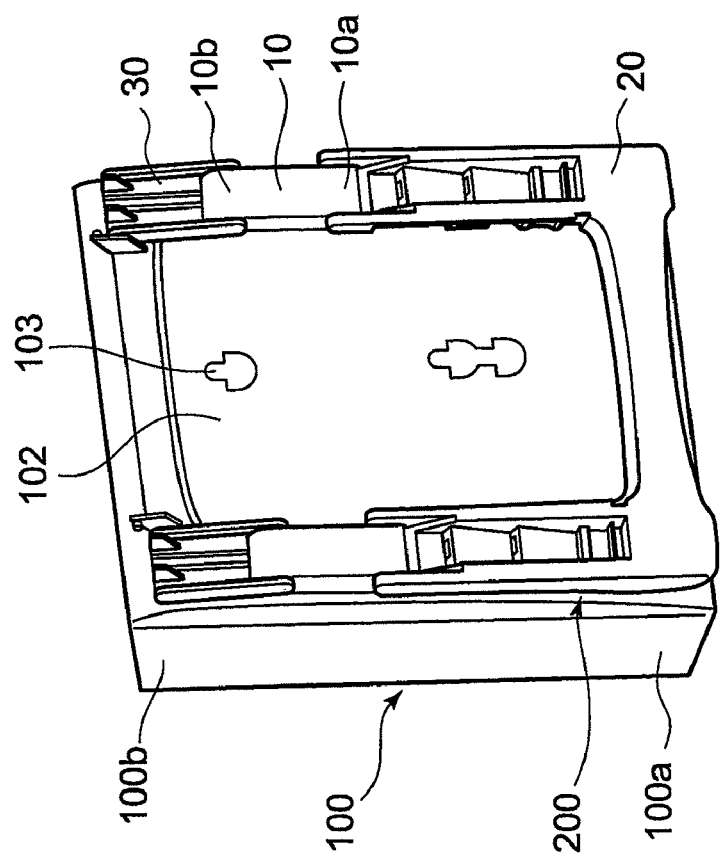
FIG. 9A is a perspective view showing the second installation mode of the electronic apparatus provided with the supporting device shown in FIGS. 1 and 2.

According to the state of FIGS. 9A and 9B, when the apparatus body 100 is laid on the supporting surface 300 or installed with wall hanging, the leg 20 and the support 30 are not overlapped with each other, and are folded in substantially parallel to the back surface 102 of the apparatus body 100. In this regard, a reference numeral 103 in FIG. 9A denotes a slot corresponding to a hook (not shown in the drawings) provided on a wall surface, which is used when the apparatus body 100 is hung on the wall.

In this regard, each of the leg 20 and the support 30 is formed as a single part by resin molding except for a foot (slip resistance) attached to the rotary end portion 20a of the leg 20.

Further, the base 10 may be formed integrally with the apparatus body 100 as a part of the back surface 102 of the apparatus body 100.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A supporting device capable of installing an apparatus body of an electronic apparatus at a standing state on a supporting surface, the supporting device comprising:
    a leg which is rotatably provided on a back surface of the apparatus body at the standing state and is used for holding the apparatus body supported by the supporting surface;
    a support which is rotatably provided on the back surface and engaged with the leg for defining an angle of the leg with respect to the back surface, and a base which is provided on the back surface and extends in a longitudinal direction of the electronic apparatus,
    wherein the leg and the support are foldable in substantially parallel to the back surface without overlapping with each other,
    wherein the leg is rotatably attached to a lower end portion of the base in the longitudinal direction and includes a rotary end portion which is capable of approaching and getting away from a lower end portion of the back surface in the longitudinal direction, and
    wherein the support is attached to an upper end portion of the base in the longitudinal direction and includes a rotary end portion which is capable of approaching to and getting away from an upper end portion of the back surface in the longitudinal direction.

2. The supporting device according to claim 1, wherein the rotary end portion of the support engages with a middle portion of the leg, whereby a rotary angle of the leg is set to measure according to a standing angle of the apparatus body.

3. The supporting device according to claim 1, wherein each of the leg and the support has a rotary end portion and is foldable to make the rotary end portion approaches the back surface.

4. The supporting device according to claim 1, wherein the leg has a plurality of support receiving sections formed so as to be arranged in a saw-tooth and staircase pattern, and the support selectively engages with any of the support receiving sections.

5. The supporting device according to claim 4, wherein, when the support receiving section with which the support is to engage is changed so as to make an angle between the back surface and the leg smaller, the support is movable with a latch mechanism while keeping in contact with the leg.

6. The supporting device according to claim 1, wherein each of the leg and the support is a single part formed by resin molding.

7. An electronic apparatus comprising an apparatus body of the electronic apparatus and the supporting device according to claim 1.

8. The electronic apparatus according to claim 7, further comprising a base which is provided on the back surface and extends in a longitudinal direction of the electronic apparatus,
    wherein the leg is rotatably attached to a lower end portion of the base in the longitudinal direction and includes a rotary end portion which is capable of approaching and getting away from a lower end portion of the back surface in the longitudinal direction, and
    wherein the support is attached to an upper end portion of the base in the longitudinal direction and includes a rotary end portion which is capable of approaching to and getting away from an upper end portion of the back surface in the longitudinal direction, and
    wherein the base is formed as a part of the apparatus body.

9. The electronic apparatus according to claim 7, further comprising a base provided on the back surface, the base extending in a longitudinal direction of the electronic apparatus,
    wherein the leg is rotatably attached to a lower end portion of the base in the longitudinal direction and includes a rotary end portion which is capable of approaching and getting away from a lower end portion of the back surface in the longitudinal direction, and
    wherein the support is attached to an upper end portion of the base in the longitudinal direction and includes a rotary end portion which is capable of approaching to and getting away from an upper end portion of the back surface in the longitudinal direction, and wherein the base is made as an element separate from the apparatus body and attached to the apparatus body.

10. A supporting device capable of installing an apparatus body of an electronic apparatus at a standing state on a supporting surface, the supporting device comprising:

a leg which is rotatably provided on a back surface of the apparatus body at the standing state and is used for holding the apparatus body supported by the supporting surface; and a support which is rotatably provided on the back surface and engaged with the leg for defining an angle of the leg with respect to the back surface, wherein the leg and the support are foldable in substantially parallel to the back surface without overlapping with each other, and wherein the leg includes;

a pair of leg elements spaced from each other in a lateral direction of the apparatus body; and a connecting element for connecting between the leg elements, and wherein the support includes;

a pair of supporting elements spaced from each other in the lateral direction of the apparatus body; and a connecting element for connecting between the supporting elements.

11. The supporting device according to claim 10, wherein at least one of the leg elements has a plurality of support receiving sections formed so as to be arranged in a saw-tooth and staircase pattern, and the support selectively engages any of the support receiving sections.

12. The supporting device according to claim 11, wherein the support has a protruding piece for engaging with any of the support receiving sections.

13. The supporting device according to claim 11, wherein at least one of the leg elements includes:

a plurality of knots which are arranged so as to correspond to the plurality of support receiving sections; and a rib which extends over the plurality of knots, wherein the support has an elastic protrusion for engaging any of the knots with the rib to prevent release from the leg.

14. The supporting device according to claim 10, wherein each of the leg and the support is a single part formed by resin molding.

15. An electronic apparatus comprising an apparatus body of the electronic apparatus and the supporting device according to claim 10.

16. The electronic apparatus according to claim 15, further comprising a base which is provided on the back surface and extends in a longitudinal direction of the electronic apparatus, wherein the leg is rotatably attached to a lower end portion of the base in the longitudinal direction and includes a rotary end portion which is capable of approaching and getting away from a lower end portion of the back surface in the longitudinal direction, and wherein the support is attached to an upper end portion of the base in the longitudinal direction and includes a rotary end portion which is capable of approaching to and getting away from an upper end portion of the back surface in the longitudinal direction, and wherein the base is formed as a part of the apparatus body.

17. The electronic apparatus according to claim 15, further comprising a base provided on the back surface, the base extending in a longitudinal direction of the electronic apparatus, wherein the leg is rotatably attached to a lower end portion of the base in the longitudinal direction and includes a rotary end portion which is capable of approaching and getting away from a lower end portion of the back surface in the longitudinal direction, and wherein the support is attached to an upper end portion of the base in the longitudinal direction and includes a rotary end portion which is capable of approaching to and getting away from an upper end portion of the back surface in the longitudinal direction, and wherein the base is made as an element separate from the apparatus body and attached to the apparatus body.

* * * * *